United States Patent [19]

Walker

[11] Patent Number: 4,642,070
[45] Date of Patent: Feb. 10, 1987

[54] AUTOMATIC VARIABLE SPEED TRANSMISSION

[75] Inventor: Harold L. Walker, Dunedin, Fla.

[73] Assignee: Albert C. Nolte, Jr., Jericho, N.Y.; a part interest

[21] Appl. No.: 777,908

[22] Filed: Sep. 19, 1985

Related U.S. Application Data

[63] Continuation of Ser. No. 314,606, Oct. 26, 1981, abandoned.

[51] Int. Cl.⁴ .............................................. B62M 9/08
[52] U.S. Cl. ........................................ 474/57; 474/49
[58] Field of Search .................................. 474/49–50, 474/52–57

[56] References Cited

U.S. PATENT DOCUMENTS

| | | | |
|---|---|---|---|
| 2,421,368 | 6/1947 | Aubert | 474/56 |
| 2,584,447 | 2/1952 | Hayot . | |
| 2,603,978 | 7/1952 | Gaisset | 474/57 |
| 3,230,788 | 1/1966 | Henley . | |
| 3,798,989 | 3/1974 | Hunt . | |
| 3,969,948 | 7/1976 | Pipenhagen | 474/57 |
| 3,995,508 | 12/1976 | Newell | 474/56 |
| 4,164,153 | 8/1979 | Moritsch et al. . | |
| 4,493,678 | 1/1985 | Husted | 474/49 |
| 4,521,207 | 6/1985 | Husted | 474/48 |

FOREIGN PATENT DOCUMENTS

| | | | |
|---|---|---|---|
| 849941 | 12/1939 | France | 474/56 |
| 486235 | 11/1953 | Italy | 474/56 |
| 287450 | 4/1953 | Switzerland | 474/49 |
| 453712 | 9/1936 | United Kingdom | 474/57 |
| 625112 | 5/1946 | United Kingdom | 474/56 |

OTHER PUBLICATIONS

Scott, "Automatic Bike Transmission", Popular Science, Nov. 1980, pp. 82-83.

Primary Examiner—Lawrence Staab
Attorney, Agent, or Firm—Nolte, Nolte and Hunter

[57] ABSTRACT

A multi speed transmission mechanism for use on a bicycle, for example, wherein pressure on the pedal by the operator decreases or increases the diameter of the driver sprocket wheel to alter the gear ratio correspondingly. The sprocket is provided with opposed segments which are linked to both the sprocket wheel and an inner control disc. The segments move radially outwardly or inwardly in unison responsive to limited rotation of the control disc independently of rotation of the sprocket. Such rotation is foot controlled by the operator. Pressure on the foot pedal by the operator increases or decreases the working length of the bicycle sprocket chain by making the effective diameter of the sprocket smaller or larger. This alters the gear ratio correspondingly. The gear ratio may be maintained without change by a locking device on the sprocket wheel in contact with the control disc.

14 Claims, 12 Drawing Figures

AUTOMATIC VARIABLE SPEED TRANSMISSION

This is a continuation of application Ser. No. 314,606, filed Oct. 26, 1981, now abandoned.

BACKGROUND OF THE INVENTION

1. Field of the Invention

The present invention concerns a variable speed transmission mechanism, adapted for use in bicycles for example, wherein the working diameter of the bicycle sprocket wheel or driving member of the transmission is increased or decreased responsive to variations in pedal pressure by the feet of the bicycle rider.

2. Description of the Prior Art

Apparatus suitable for varying the effective diameter of a bicycle sprocket wheel operable as the driver member of a variable speed transmission has been disclosed in the patent to Hunt U.S. Pat. No. 3,798,989. The settings of a sprocket diameter therein illustrated are controlled by a manually operable so-called "interposer", which forces a plurality of coacting segments radially outwardly, thereby increasing the sprocket wheel diameter. The interposer also releases such segments to effect a retraction of the segments thereby decreasing the diameter of the sprocket wheel.

While the Hunt transmission mechanism above summarized does not require a plurality of sprockets or cooperating derailleur mechanisms (such as other conventional bicycle transmissions require (it does entail a hand operated transmission shift and is limited to achieve a relatively small number of speed ratios or speed capabilities.

SUMMARY OF THE INVENTION

By eliminating the manually operated "interposer" of Hunt and substituting therefor a foot controlled mechanism for varying the effective diameter of the bicycle sprocket wheel, virtually unlimited automatic gear changes may be effected from pedal crank torque.

More particularly, according to the present invention, spring means may be provided for provisionally maintaining the sprocket wheel segments in maximum gear ratio; and downward pedal pressure by the bicycle rider increases the sprocket chain tension and thereby overcomes the provisional restraint acting upon the segments so as to move them radially inwardly, thereby decreasing the effective diameter of the sprocket wheel and automatically changing the gear ratio of the present transmission. By decreasing the pedal pressure, the operation is reversed, thereby to increase the diameter of the sprocket member of the bicycle.

Should the operator desire to have a constant diameter it is only necessary to actuate a gear ratio lock which is also provided to maintain the sprocket segments locked in the gear of his choice.

Means may also be provided for giving an elliptical shape to the sprocket segments so that the effective diameter is increased on the downstroke which is an especially advantageous feature in racing.

Furthermore, while the present automatic transmission has been designed primarily for bicycles it has many other applications. That is to say, it is applicable to any transmission member made up of a driver, a driven element, and a flexible drive interconnecting both driver and driven members.

Further according to the invention, means are provided for locking-in the gear selection of choice of the operator and virtually unlimited multiple gear choices are possible. In addition to providing an elliptically shaped sprocket wheel other sprocket wheel configurations may be obtained. Still another feature of the invention is that in modifying the gear ratio there is no hesitation gap or delay in moving from one speed to another, such changes being automatic.

It will also be understood that by modifying conventional transmission arrangements and eliminating the multiple sprockets, a bicycle constructed according to the present invention will be much lighter than existing gear systems and more compact than such. It will also be much safer in that there is no distraction involved in changing the gear and the operator may keep both hands on the handle bars at all times instead of using one hand to manually operate a gear shift such as the interposer assembly of the Hunt patent above discussed.

Still further, the present transmission can be used in reverse gearing with other power sources such as lawnmowers. And the gear itself can work in reverse from shaft torque; with an increase in torque increasing the working diameter of the sprocket instead of decreasing such diameter. The spring tension can be adjusted for soft or hard gear changes depending on the pedal pressures or shaft torque changes required.

To compensate for the variably changing diameter of the present transmission sprocket member, a conventional yieldable slack storing device is provided for maintaining the sprocket chain under uniform tension.

According to one embodiment, an assembly of coacting radial and spiral slots enables retraction and expansion or projection of the bicycle sprocket segments. In another, a linkage assembly replaces the slots to control gear ratio choice and uniform sprocket control. Still another form of the invention contemplates a pinion gear and gear rack mechanism for changing the gear ratios. In a further embodiment, a cam movement is utilized to keep the sprocket change synchronized with the sprocket wheel segments.

BRIEF DESCRIPTION OF THE DRAWINGS

With the above and other objects in view, as will be apparent, the invention consists in the construction combination and arrangement of parts, all as hereinafter more fully described, claimed, and illustrated in the accompanying drawings wherein:

DETAILED DESCRIPTION OF THE INVENTION

Figure 1:
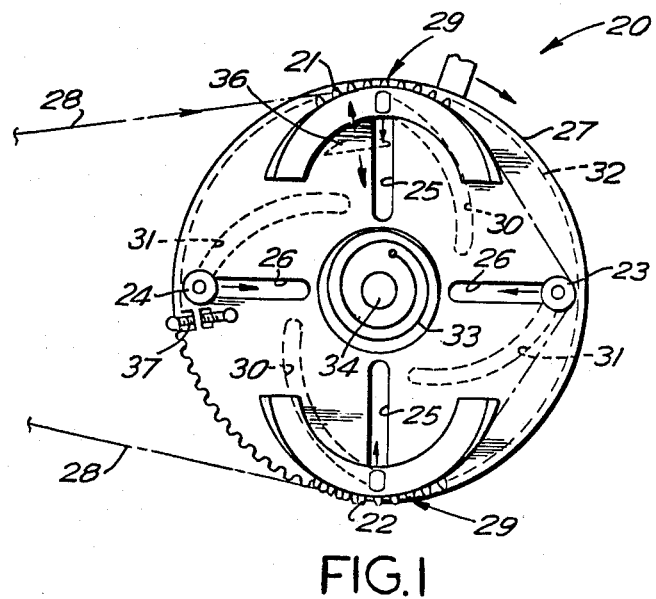
FIG. 1 is a schematic side view of the radial/spiral slots formed of the present invention with the sprocket members thereof in the expanded larger diameter working position.

Referring now more particularly to the drawings:

FIG. 1 thereof is illustrative of one embodiment of the present invention identified for convenience as transmission type "A". As there seen, such transmission 20 may comprise a pair of opposed and spaced sprocket segments 21 and 22 and a pair of opposed and spaced flanged sprocket chain guides 23, 24. The sprockets 21 and 22 together with the guide members 23, 24 are constructed and arranged to be reciprocated in their respective radial slots 25, 26 of a sprocket wheel 27 to correspondingly increase or decrease the effective working length of the sprocket chain 28, the links of which are trained over the teeth 29 of the sprocket segments 21 and 22.

The segments 21, 22 and the coacting flanged chain guides 23, 24 are simultaneously disposed in the spiral slots 30, 31 respectively, of a separate and independent control disc 32. Chain guides 23, 24 are untoothed and are, thus, passive as concerns driving the chain, providing only guiding of the chain in the chain path which varies in diameter during gear ratio change, thus avoiding sprocket-tooth disorientation as would be the case if the guides were toothed.

Figure 2:
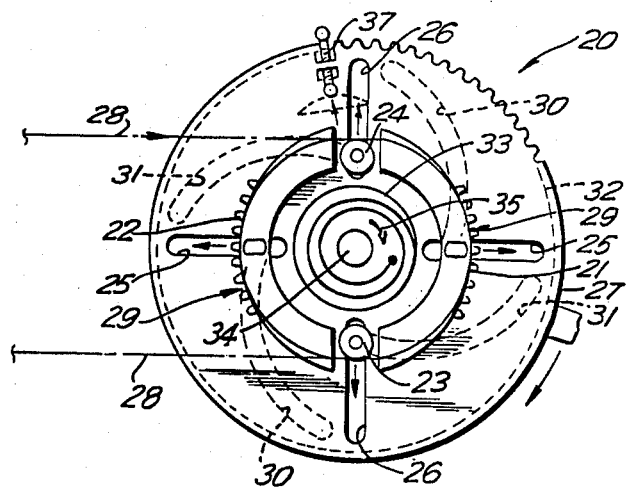
FIG. 2 is a similar view of the same arrangement but in the retracted position of smaller diameter sprocket.

The gear ratio illustrated in FIG. 1 hereof is the maximum gear ratio obtainable. It may be held fixed in that position as by means of a conventional spiral restraining spring 33. A downward pressure by the bicycle rider on the pedal crank 34 in the direction indicated by the arrow will automatically and correspondingly increase the tension upon chain 28 and thereby simultaneously move both of the sprocket segments 21, 22 together with both of the flanged roller guides 23, 24 inwardly in the direction of the sprocket hub 35 as indicated in FIG. 2. The riders choice of gear ratios may be remotely controlled by movement of a gear ratio controller 36 located on the bicycle frame. This operates to unlock the gear ratio lock 37 as the sprocket 22 is clear of the chain 28 thereby permitting the control disc 32 to turn. While maintained in this unlocked position or mode there is thus provided a fully automatic transmission which is controlled by downward pedal pressure. If the pressure is increased then the diameter of the sprocket wheel 29 will be correspondingly decreased to the minimum diameter illustrated in FIG. 2 hereof. That minimum gear may be held for all further turns of the sprocket wheel provided only that the pedal pressure on the crank 34 by the bicycle rider remains unchanged. If the pedal pressure is decreased this will allow the control disc to reverse its direction of motion and thereby increase the effective or working length of chain 28. Should the operator want a constant length he need only allow the gear ratio lock 37 located on the control disc 32 to remain locked in the gear of his choice.

The transverse of the flanged roller chain guides 23, 24 travel can be less than that of the sprocket segments 21, 22 thereby imparting an elliptical shape to the sprocket wheel 27 so that the diameter of that wheel is increased on the downstroke. This is a feature much desired in bicycle racing.

As will also be appreciated, with the arrangement and construction just described a substantial number of gear ratio changes may be obtained and many different sprocket wheel shapes effected. If desired the flanged roller guide members 23 and 24 can be eliminated entirely. It must also be pointed out that while the present automatic transmission has been designed with particular reference to bicycles it has many other applications. For example, in addition to being utilized for bicycles it is equally applicable to provide an automatic variable speed transmission for lawnmowers and motorcycles, for automobiles, mopeds, trucks and tractors, and for other motorized vehicles. It may also be used on other chain-driven not mnotorized articles or implements such as tricycles and bicyles built for two or more riders.

Figure 3:
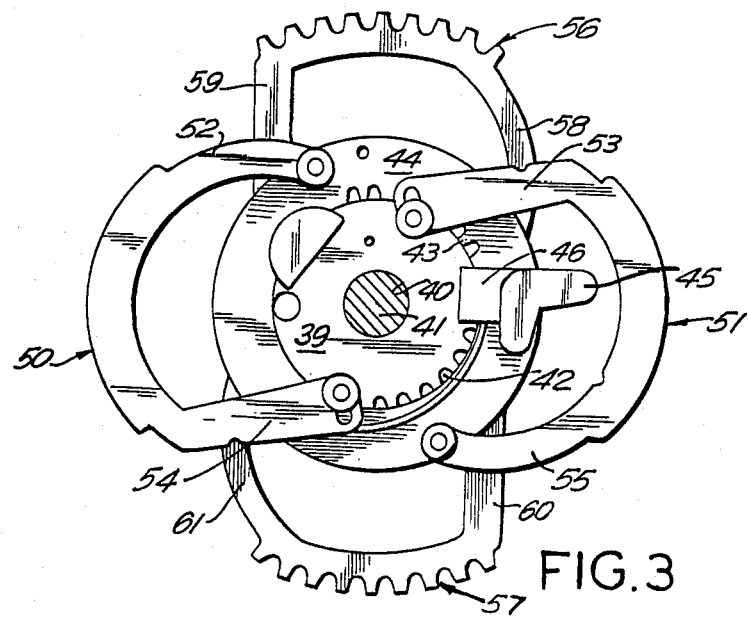
FIGS. 3–6 are schematic side views of the preferred embodiment, wherein a linkage assembly replaces the slotted construction of FIGS. 1 and 2, with the sprocket illustrated in an expanded elliptical position in FIGS. 3 and 4, and retracted in FIGS. 5 and 6.
Figure 4:
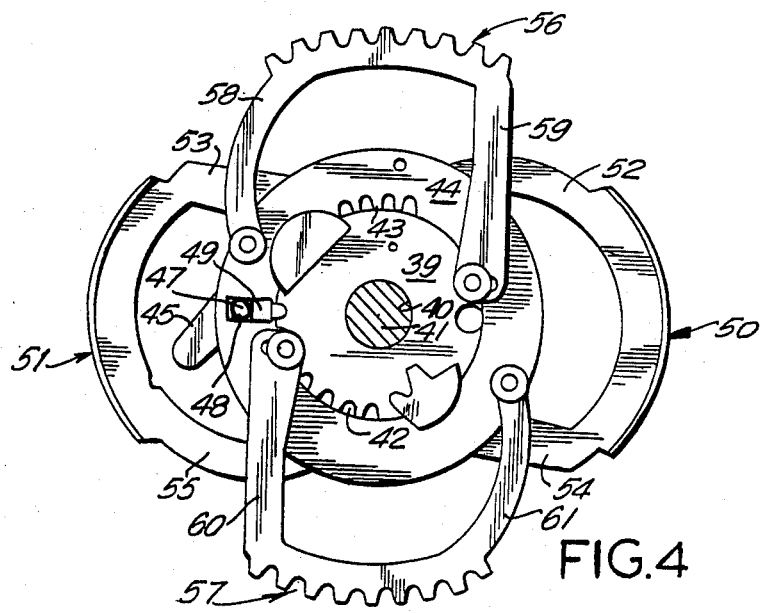
Figure 5:
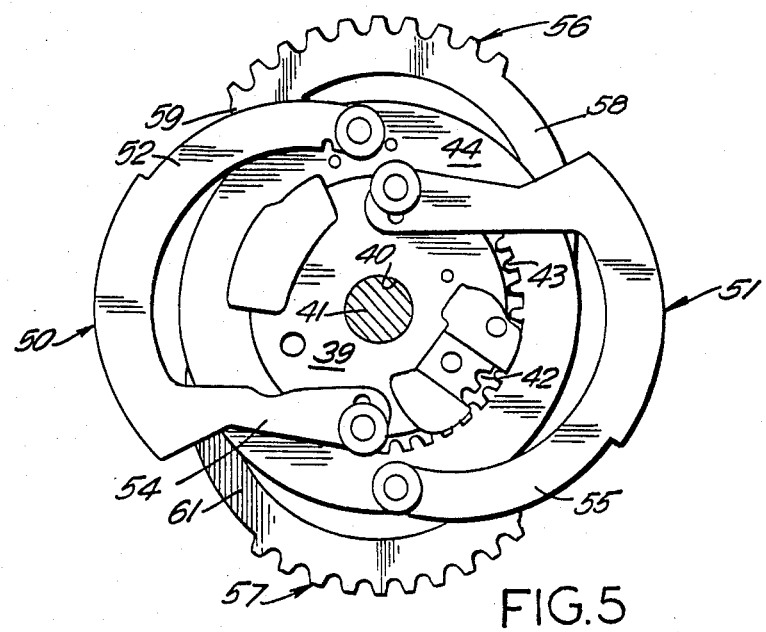
Figure 6:
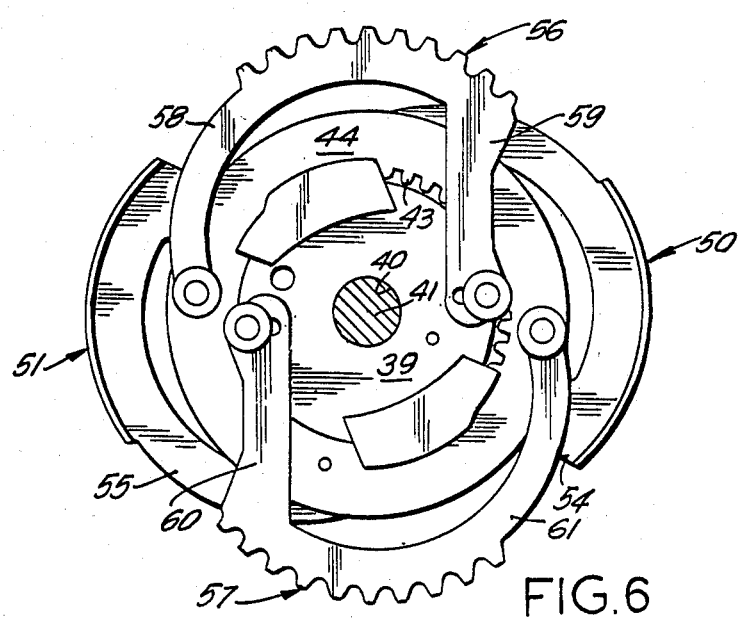

FIGS. 3–6 illustrate a preferred embodiment of the present invention, which comprises a lightweight transmission particularly appropriate for racing bicycles where an elliptically shaped sprocket wheel is specially advantageous. The same controls are used here in this embodiment which is labeled for convenience transmission type "B" as the controls of transmission type "A" above discussed and described. This type "B" transmission is substantially the same as that of the type "A" in respect of the gear ratio controller, gear ratio lock, restraining spring, and other components above described with the exception that here in this embodiment a linkage assembly replaces the radial slot members 25, 26 of sprocket wheel 27 and also replaces the spiral slots 30, 31 of the separate control disc 32. In FIGS. 3 and 4 the effective chain length of the bicycle is increased to its greater ratio whilst in FIGS. 5 and 6 the mode is the opposite in that the gear ratio is the smallest obtainable. More particularly FIGS. 3 and 4 illustrate both sides of the transmission type "B" in the expanded position. FIGS. 5 and 6 show the same two sides but in the retracted position.

In FIG. 3 one side or the outer face (so to speak) of the automatic transmission 38 is seen to comprise a control disc 39 having a central opening 40 large enough in diameter to accommodate a pedal crank shaft 41. A portion of the outer periphery of the control disc 39 is cut out or notched as at 42 to receive teeth 43 in spaced relationship projecting from the inner periphery of the sprocket wheel 44 which interfits with the control disc 39. A bell crank 45 secured to a fitting 46 on the side of the sprocket wheel 44 and associated with a cooperating pin 47 rotatable in a slot 48 to bear against a pawl 49 on the oppoiste side (see FIG. 4) of the sprocket wheel 44 constitutes means for locking the control disc 39 and the sprocket wheel 44 together against relative movement with respect to each other.

A pair of opposed and bifurcated flanged guides 50, 51 for the sprocket chain (not shown) are disposed on either side of both the control disc 39 and the sprocket wheel 44. That is to say, each of the flanged guides 50, 51 has two prongs or legs. The upper leg 52 of the guide 50 is fastened for pivotal movement to the sprocket wheel 44; whilst the upper leg 53 of the other guide 51 is pivotally attached to the control disc 39. Similarly, the lower leg 54 of the guide 50 may be pivotally joined to the central control disc 39 with the lower leg 55 of the guide 51 pivoting from the sprocket wheel 44.

With the relative arrangement of parts just described, as will be appreciated, between the inside control disc 39 and the outer sprocket wheel 44 in conjunction with the legs 52-55 of the opposed flanged guides 50 and 51 which are attached to both disc 39 and sprocket wheel 44, means are thereby provided for limited relative movement between the disc 39 and sprocket 44; and also means for unlimited simultaneous rotary motion of the disc 39 and sprocket 44; in unison and to the same degree or extent.

Looking now at FIG. 4 we see the opposite side or face of the relative arrangement between the disc 39 and the sprocket wheel 44 discussed above in connection with the attachment thereto of the opposed flanged guide members 50, 51. That is to say, in FIG. 4 there are comprised two opposed sprocket segments 56 and 57 both of which are bifurcated in the same way as are the legs 52-55 of the opposed flange guides 50 and 51.

More particularly, the left hand leg 58 of the upper sprocket segment 56 is fixed for limited pivotal movement to one portion of the sprocket wheel 44 whilst the right hand leg 59 of the upper segment 56 is pivotally secured for limited rotary movement to the inner control disc 39. In the same way, the bottom or lower sprocket segment 57 is bifurcated to comprise a left hand projection or leg 60 which is pivotally secured to the inner control disc 39 with the right hand member or leg 61 of the lower segment 57 being pivotally attached to the outer sprocket wheel 44.

With the arrangement just described wherein (as seen in FIG. 4) the righthand leg 59 of the upper segment 56 is pivotally attached to the inner control disc 39 and the left hand leg 60 of the lower segment 57 is attached in the same way to the same control disc 39; and with the left hand leg 58 of the upper segment 56 and the right hand leg 61 of the lower segment 57 being similarly pivotally attached to the outer sprocket wheel 44, means are thus provided for limited relative movement between the inside disc 39 and the outer sprocket 44 to thereby permit expansion and contraction or increase and decrease in diameter of the two segments 56, 57. At the same time, the lock means 45-49 (above discussed) are provided for preventing relative movement between the disc 39 and the sprocket wheel 44 thus preventing either the increase or the decrease in extension of the segments 56, 57.

FIGS. 5 and 6 also illustrate the structure of the preferred form of the present invention and correspond respectively to the illustrations of the previously discussed FIGS. 3 and 4. That is to say FIG. 5 corresponds to the structure of FIG. 3 and presents one side of the present transmission "B" but shown in the retracted position of a smaller effective diameter for the sprocket segment 56, 57. The FIG. 6 shows the other side of the preferred automatic transmission "B", also in the retracted position of the two coaching segments 56 and 57.

Referring now more particularly to these last mentioned FIGS. 5 and 6 each of the two gear segments 56, 57 comprise two legs 58, 59 and 60, 61 (respectively) one of which is attached to the control disc 39 with the other leg being attached to the sprocket wheel 44. The structure and operation of this assembly of the two wheels 39 and 44 and the two segments 56 and 57 corresponds to that of FIGS. 3 and 4. The same thing applies with respect to the two guide members as seen in FIGS. 5 and 6. There each of the guide members 50 and 51 has two legs 52, 54 and 53, 55 (respectively) one of which is attached to the inner control disc 39 with the other leg being attached to the outer sprocket wheel 44. As will be appreciated, in the arrangement just discussed, with the rotation of the inner control disc 39 and the outer sprocket wheel 44 in unison, the position of the two segments 56, 57 and of the two guides 50, 51 will be changed in correspondence therewith. This effects an automatic change in the gear ratio of the transmission which may be fixed as above explained by locking the teeth portions 42 of the control disc 39 in whatever position the operator desires with respect to the grooves 43 on the inner periphery of the sprocket wheel 44.

With the arrangement just described, as will be apparent, pressure on the pedal crank 34 will effect rotary movement of the control disc 39 independently of rotation of the outer sprocket wheel 44 except as limited by the attachment of one leg 52, 55 of the guide members 50, 51 and one leg 58, 61 of each of the sprockets 56, 57 to the outer sprocket wheel 44. To that extent rotation of the control disc 39 in one direction will operate to simultaneously retract both of the guide members 50, 51 and both of the segments 56 an 57. On the other hand, when and if the operator of the bicycle desires to maintain a fixed gear means 45-49 between the control disc 39 and the sprocket wheel 44 such that rotation of the control disc 39 will cause the sprocket wheel 44 simultaneously to rotate in the same direction and to the same degree: but only to the extent permitted by the attachment of one leg 52 and 55 of each of the two guides 50 and 51 and one leg 58 and 61 of each of the two sprocket segments 56 and 57 to the sprocket wheel 44.

Thus, the maximum gear ratio is illustrated in FIGS. 3 and 4 and the minimum gear ratio in FIGS. 5 and 6. Instead of maintaining a particular gear ratio by means of the pin and slot locking arrangement 45-49 other conventional locking means may be substituted therefor.

Figure 7:
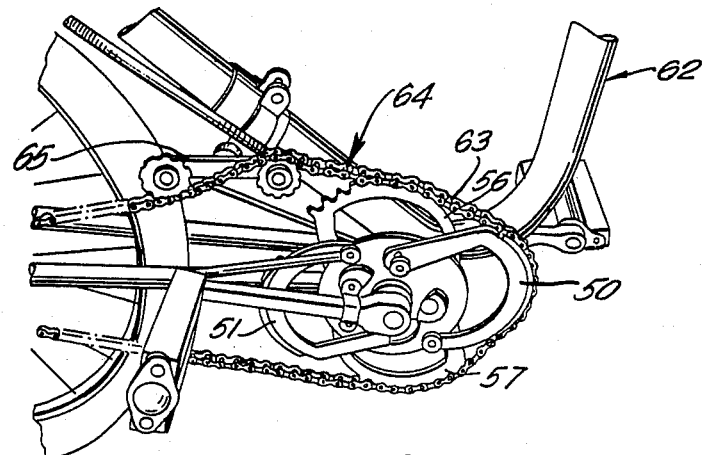
FIG. 7 is a partial side view of a bicycle fitted out with the preferred embodiment comprising the linkage assembly of FIGS. 3–6 with the sprocket thereof expanded elliptically as seen in FIGS. 3 and 4.
Figure 8:
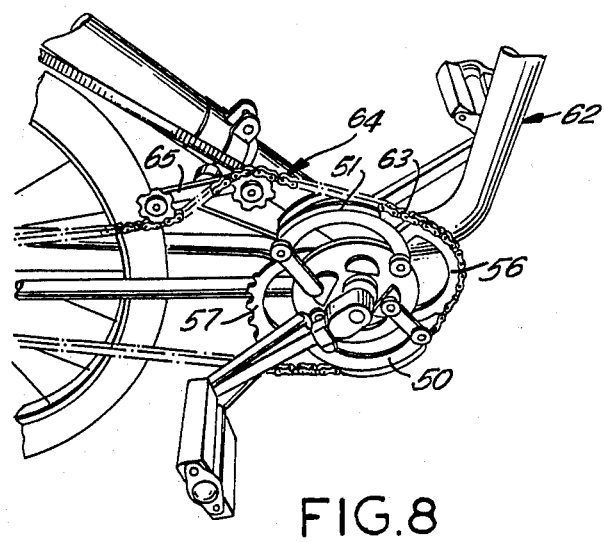
FIG. 8 is a like view of the bicycle of FIG. 7, but with the sprocket in its retracted form of reduced working diameter as noted in FIGS. 5 and 6.

FIG. 7 represents the application of the transmission assembly seen in FIGS. 3, 4, 5, and 6 to an otherwise conventional bicycle frame 62 wherein the automatic transmission is seen in its expanded position with the gear segments 56 and 57 engaging the links 63 of the sprocket chain 64 and the gear in maximum ratio. FIG. 8 is a similar view of the transmission but with the gear ratio in its minimum mode with the links 63 of the sprocket chain 64 riding over the opposed guide members 50 and 51 and only one of the two sprocket wheel segments 56, 57, namely the segment 56.

Conventional means for maintaining uniform tension of the sprocket chain around the sprockets 56, 57 of the bicycle chain may be seen at 65 in FIGS. 7 and 8.

Figure 9:
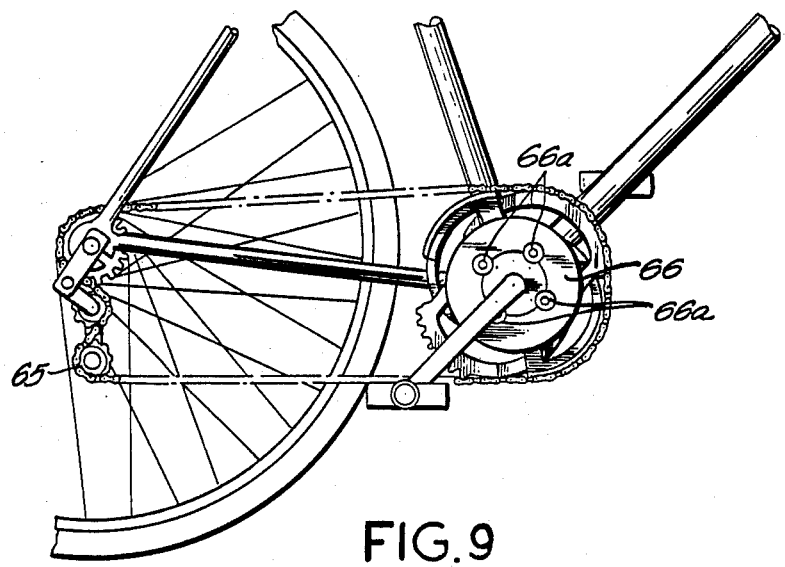
FIGS. 9 and 10 correspond to the bicycle illustrations of FIGS. 7 and 8, respectively, with the addition of a cover plate or shield over the sprocket assembly of the present transmission.
Figure 10:
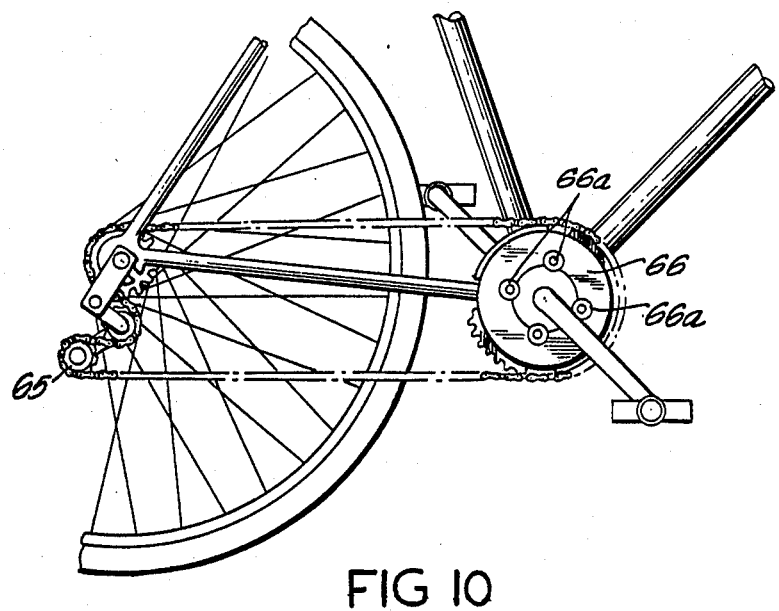

FIGS. 9 and 10 also illustrate the arrangements of FIG. 7 and 8 with the maximum and mimimum gear ratios except that in FIG. 9 and FIG. 10 an outer shield or plate member 66 is secured to the transmission 39 as by the lugs 66a and is superposed over the outer face of the gear transmission 38.

Figure 11:
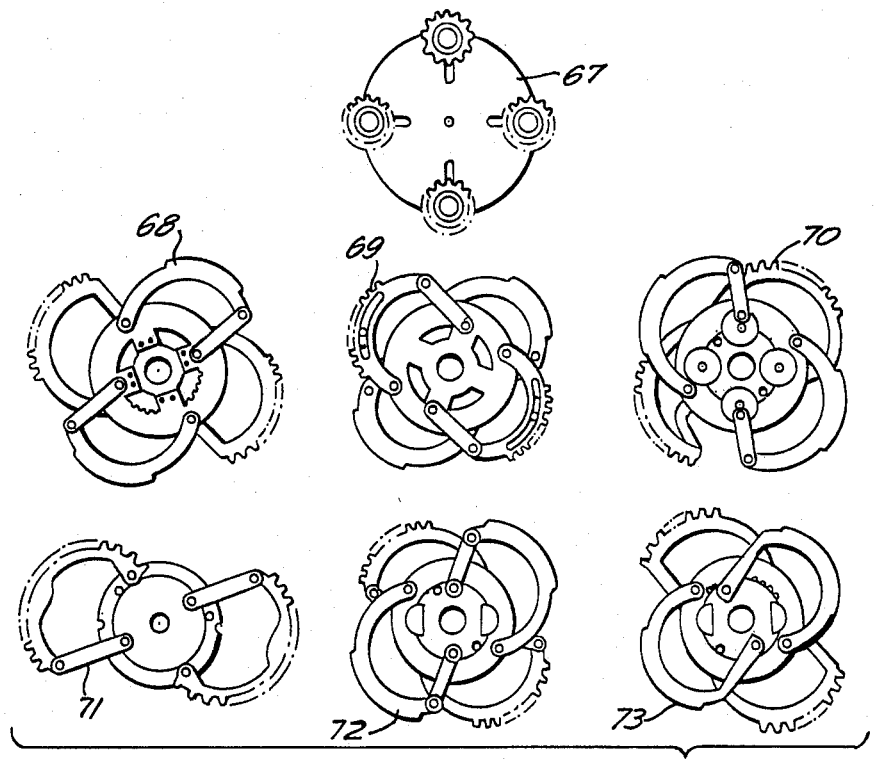
FIG. 11 is a plan view of a series of the present sprocket assemblies, all in the expanded mode of increased sprocket diameters.

FIG. 11 as above indicated illustrates a plurality of automatic transmission sprockets 67-73 according to the present invention. The sprocket 67 at the top is illustrative of the sprockets and flange roller guides discussed above in connection with FIGS. 1 and 2 whilst the remaining assemblies illustrate the automatic transmissions of FIGS. 3 and 4 but all in the expanded or maximum gear ratio mode.

Figure 12:
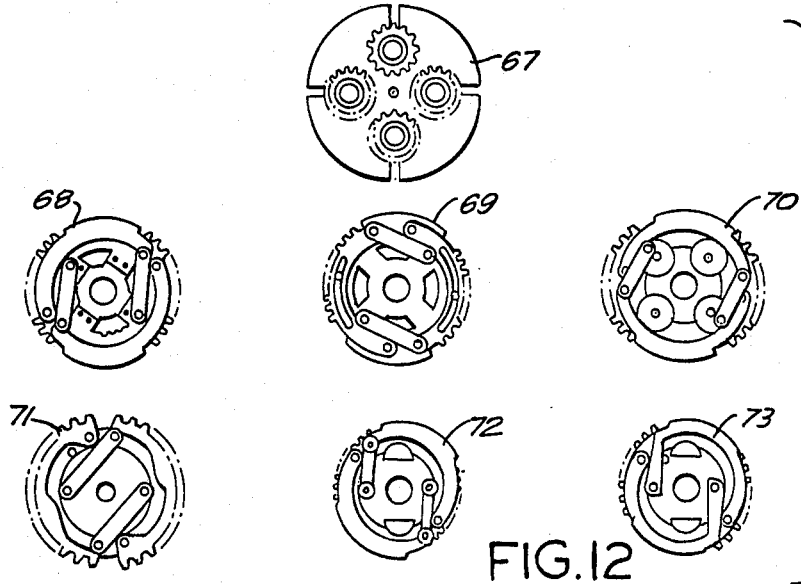
FIG. 12 is a corresponding view of the sprocket designs of FIG. 11, all in the retracted mode of smaller diameter sprockets.

FIG. 12 is another illustration of the sprockets of FIG. 11 except that in this instance all of the transmission sprockets 67-73 are shown in their respective retracted positions or minimum gear ratios.

As will be noted, in FIG. 11 and FIG. 1c the two flanged guide members are omitted from the sprocket 71. This results in a lighter weight transmission assembly especially adapted to use of bicycles so equipped as "exerciser" bicycles which remain stationary while the operator cranks the bicycle pedals.

Thus, the invention includes novel locking means for releasably locking the drive disc and the control disc for and against relative movement and novel drive and chain guide segments having integral bifurcated legs pivotally mounted in bearing means on respective discs with one bearing means for each bifurcated segment being sloted.

What is claimed is:

1. An automatic variable speed transmission comprising:

a drive shaft;

a first disc fixed to said drive shaft for rotation therewith;

a second disc mounted for rotation about said drive shaft;

a pair of circumferentially spaced diametrically disposed drive segments, each of said drive segment being mounted to both said first disc and said second disc for radial movement relative to said drive shaft in unison, in the same direction and to the same degree to a radially outermost position, a radially innermost position and to intermediate positions therebetween, upon relative rotational movement of said first disc and said second disc, each said drive segment comprising peripheral means for driving engagement with a driven element within the same sector of revolution in all positions of said drive segments;

a spiral spring positioned around said shaft, means mounting one end of said spring radially inwardly of the periphery of said discs for rotation with said shaft and said first disc, means mounting the other end of said spring to said second disc, said spring biasing said second disc against rotational movement in one direction and to rotate in the other direction to move said drive segments radially outwardly towards their respective outermost positions, radially inward pressure on said drive segments causing said second disc to rotate against the bias of said spring in said one direction and movement of said drive segments radially inwardly to their respective innermost positions; and interacting locking means having respective operable interlocking elements located on said first disc and on said second disc and being relatively moveable from and to a normally locked position to and from an activated released position for releasably locking said first disc and said second disc against relative rotational movement, said respective operable interlocking elements on said discs being disposed radially inwardly of the outermost positions of said peripheral means of said drive segments when in the locked position, said interacting locking means including a member extending axially from one of said respective elements, said member comprising means for contacting a controller externally of said tranmsission while rotating and during each cycle of rotation thereof for moving said one of said elements out of engagement with the other during relative rotation of the shaft and disc, said member being located to comprise means for releasing said first and second discs for relative rotational movement during each cycle of rotation thereof when said member is contacting the external controller and when one of said drive segments is in driving engagement with the driven element and the other said drive segment is out of engagement with the driven element;

said drive shaft comprises a pedal crank rotatable by bicycle pedals;

said peripheral means of said drive segments comprise chain sprockets and said tranmission further comprises, as the driven element, a sprocket chain on said drive segment chain sprockets, means are provided for maintaining said sprocket chain under tension, the tension of said chain and the torque resulting from pedalling with drive shaft counteracts the biasing force of said spring and moves said segments inwardly, rotating said second disc in said one direction, when said locking elements are out of engagement; and each of said drive segments is bifurcated and comprises one leg integral with one end of said segment and extending radially inwardly and pivotally mounted at its inner end to said first disc and another leg integral with the other end of said segment and extending radially inwardly and pivotally mounted at its inner end to said second disc.

2. The transmission of claim 1, in combination with a bicycle comprising a frame, front and rear wheels rotatably mounted on said frame, a rear sprocket assembly for driving said rear wheel, controller means mounted on said frame for contacting said member extending from said transmission for moving said one of said interacting locking elements, said transmission constituting a forward sprocket assembly fixed to the frame between said wheels for rotation about the axis of said pedal crank, said sprocket chain connecting said rear and forward sprocket assemblies, and said drive segments comprise diametrically opposed toothed sprocket segments.

3. The combination of claim 2, including a pair of untoothed sprocket chain guides, each said sprocket chain guide comprising means mounted to said first disc and to said second disc in spaced relationship with respect to each other and interposed between said spaced diametrically disposed drive segments for passively guiding said sprocket chain within the sector of revolution in which said chain sprockets of one of said drive segments is in engagement with said sprocket chain.

4. The combination of claim 3, wherein said chain guides are flanged.

5. The combination of claim 3, wherein each of said chain guides is bifurcated and comprises on leg integral with one end of said chain guide and extending radially inwardly and pivotally mounted at its inner end to said first disc and another leg integral with the other end of said chain guide and extending radially inwardly and pivotally mounted at its inner end to said second disc to enable said guides to move radially in unison with radial movement of said drive segments.

6. The combination of claim 5, wherein each of said sprocket segments is bifurcated and comprises one leg integral with one end of said segment and extending radially inwardly and pivotally mounted at its inner end to said first disc and another leg integral with the other end of said segment and extending radially inwardly and pivotally mounted at its inner end to said second disc.

7. The combination of claim 6, wherein said axially extending member of said interacting locking elements comprises a bell crank lever secured to one side of one of said discs and communicating with a coacting pin and slot assembly on the obverse side thereof.

8. The combination of claim 6, wherein said interacting locking elements comprise a lever arm pivoted at one end to one of said discs and a pawl attached to the other end of said lever arm, a plurality of teeth on the periphery of the other of said discs and said controller is under the manual control of the bicycle rider to selectively move said pawl into and out of engagement between selected teeth of said other disc.

9. The combination of claim 8, wherein said controller is a cam mounted on said bicycle frame.

10. An automatic variable speed transmission comprising:
   a drive shaft;
   a first disc fixed to said drive shaft for rotation therewith;
   a second disc mounted for rotation about said drive shaft;
   a plurality of circumferentially spaced diametrically disposed drive segments, each of said drive segments being mounted to both said first disc and said second disc for radial movement relative to said drive shaft in unison, in the same direction and to the same degree, to a radially outermost position, a radilly innermost position and to intermediate positions therebetween, upon relative rotational movement of said first disc and said second disc, each said drive segment comprising peripheral means for driving engagement with a driven element within the same sector of revolution in all positions of said drive segments; and
   a plurality of circumferentially spaced diametrically disposed guide segments, each of said guide segments being mounted to both said first disc and said second disc for radial movement relative to said drive shaft in unison, in the same direction and to the same degree, to a radially outermost position, a radially innermost position and to intermediate positions therebetween, upon relative rotational movement of said first disc and said second disc;
   said guide segments being interposed between said spaced drive segments and moving radially relative to said drive shaft in unison and in the same direction with said drive segments, each said guide segment comprising peripheral means for passively guiding the driven element within the sector of revolution in which said peripheral means of one of said drive segments is in engagement with the driven element;
   said transmission further including interacting locking means on said first disc and on said second disc for releasably locking said first disc and said second disc against relative rotational movement, said interacting locking means being disposed radially inwardly of the outermost positions of said peripheral means of said drive segments when in the locked position, said interacting locking means including means for contacting a controller externally of said transmission while rotating and during any cycle of rotation thereof for releasing and locking said discs during rotation of said shaft and discs, said interacting locking means being located to comprise means for releasing said first and second discs for relative rotation during any cycle of rotation thereof when contacting the external controller and when one of said drive segments and one of said guide segments are in engagement with the driven element and their respective diametrically disposed segments are out of engagement with the driven element;
   said periperal means of said drive segments include chain sprockets;
   said drive segments comprise diametrically opposed chain sprockets; and
   each of said drive segments is bifurcated to comprise one leg integral with one end of said drive segment and extending radially inwardly and pivotally mounted at its inner end to said first disc and another leg intergral with the other end of said drive segment and extending radially inwardly and pivotally mounted at its other end to said second disc.

11. The transmission of claim 10, wherein each of said guide segments is bifurcated and comprises one leg integral with one end of said guide segment and extending radially inwardly and pivotally mounted at its inner end to said first disc and another leg integral with the other end of said guide segment and exending radially inwardly and pivotally mounted at its other end to said second disc.

12. The transmission of claim 10, wherein pin and bearing means are provided for pivotally mounting the ends of said legs of said drive segments, one of said bearing means comprising a slot.

13. The transmission of claim 11, wherein pin and bearing means are provided for pivotally mounting the ends of said legs of said guide segments, one of said bearing means comprising a slot.

14. An automatic variable speed transmission comprising:
   a drive shaft;
   a first disc fixed to said drive shaft for rotation therewith;
   a second disc mounted for rotation about said drive shaft;
   a plurality of circumferentially spaced diametrically disposed drive segments, each of said drive segments being mounted to both said first disc and said second disc for radial movement relative to said drive shaft in unison, in the same direction and to the same degree, to a radilly outermost position, a radially innermost position and to intermediate positions therebetween, upon relative rotational movement of said first disc and said second disc, each said drive segment comprising peripheral means for driving engagement with a driven element within the same sector of revolution in all positions of said drive segments; and
   a plurality of circumferentially spaced diametrically disposed guide segments, each of said guide segments being mounted to both said first disc and said second disc for radial movement relative to said drive shaft in unison, in the same direction and to the same degree, to a radially outermost position, a radially innermost position and to intermediate positions therebetween, upon relative rotational movement of said first disc and said second disc;
   said guide segments being interposed between said spaced drive segments and moving radially relative to said drive shaft in unison and in the same direction with said drive segments, each said guide segment comprising peripheral means for passively guiding the driven element within the sector of revolution in which said peripheral means of one of said drive segments is in engagement with the driven element;

each of said drive segments being bifurcated to comprise one leg integral with one end of said drive segment and extending radially inwardly and pivotally mounted at its inner end to said first disc and extending radially inwardly and pivotally mounted at its other end to said second disc;

each of said guide segments being bifurcated and comprises one leg intregral with one end of said guide segment and extending radially inwardly and pivotally mounted at its inner end to said first disc and another leg integral with the other end of said guide segment and extending radially inwardly and pivtoally mounted at its other end to said second disc.

* * * * *